3,465,065
PREPARATION OF BLOCK COPOLYMERS USING PARTICULAR POLYMERIZATION SOLVENTS
Fred Dudley Moss, Long Beach, and Arthur R. Bean, Jr., Buena Park, Calif., assignors to Shell Oil Company, New York, N.Y., a corporation of Delaware
Filed Oct. 28, 1964, Ser. No. 407,125
Int. Cl. C08d 3/02; C08f 19/06
U.S. Cl. 260—879                6 Claims

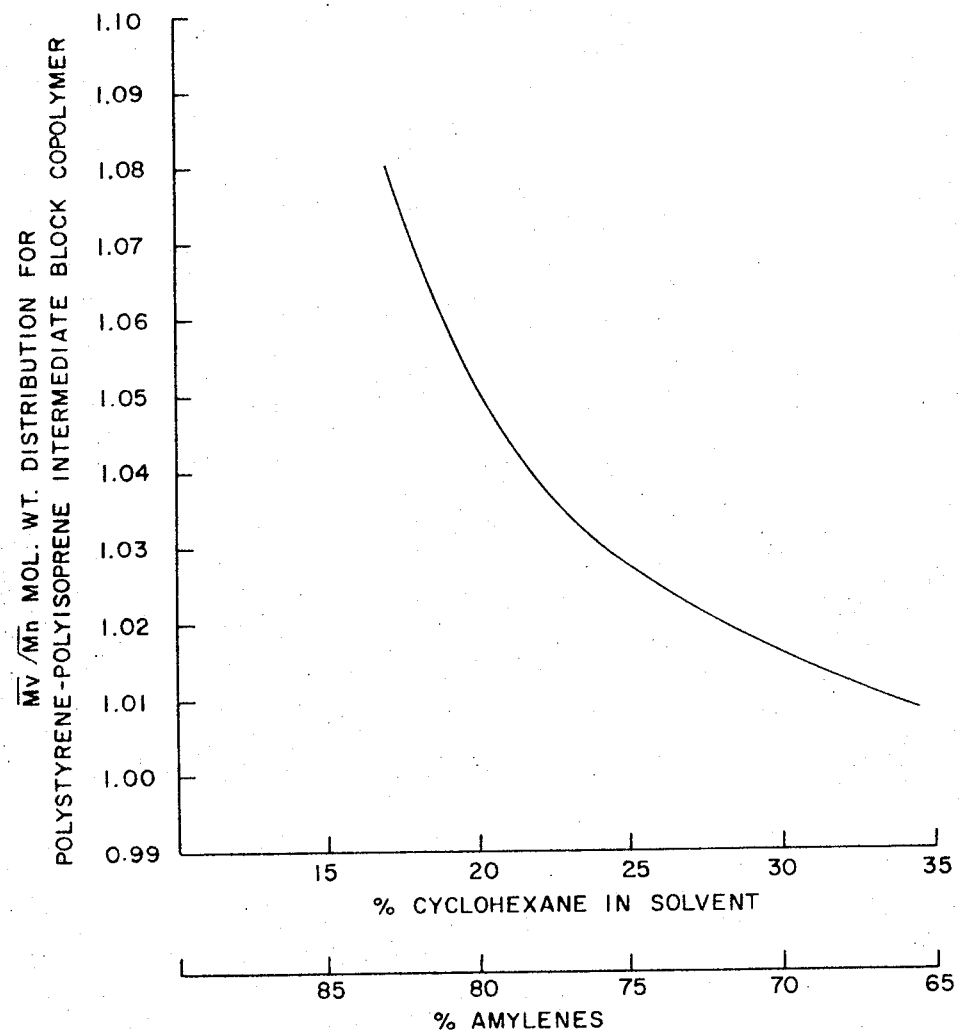

ABSTRACT OF THE DISCLOSURE

A process for making a copolymer having the general configuration

wherein each A is a polymer block of a monovinyl-substituted aromatic compound, each B is a polymer block of a conjugated diene and C is a monomeric residue of a coupling agent wherein the first block A is formed under adiabatic conditions in the presence of a $C_{6-7}$ cyclic hydrocarbon inert solvent and block B is formed in the presence of a $C_{4-5}$ open chain inert alkene solvent.

---

This invention is concerned with the preparation of certain block copolymers. More specifically, the invention is directed to processes for the preparation of block copolymers having improved uniformity of composition.

The preparation of block copolymers has developed primarily in the last few years. Several alternative processes have been investigated, dependent in part upon the quality of the products desired and the catalyst systems capable of forming them. One of the more interesting types of block copolymers is that prepared from monovinyl-substituted aromatic compounds, such as styrene, and from conjugated dienes, such as isoprene or butadiene. While these block copolymers may have any number of polymeric blocks, each having a differing identity from the adjacent blocks in the polymer chain, the type with which the present invention is concerned is that having the structure

A—B—A wherein each of the blocks A is a polymer block of a monovinyl-substituted aromatic compound and B is a polymer block of a conjugated diene. Two typical block copolymers of this type are polystyrene-polyisoprene-polystyrene and polystyrene-polybutadiene-polystyrene. These products may be hydrogenated subsequent to their formation for the purpose of improving their stability toward oxidative degradation and for improving their service temperatures due to an increase in their softening point upon dehydrogenation.

More particularly, the block unit B in the above configuration is more specifically defined as having the structure in the present process of

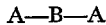

wherein the unit C in this generalized configuration is the residue of a coupling agent connected A—B— units to form the entire block copolymer, which then has the special configuration A—B—C—B—A.

In the following discussion, except where necessary, reference will be made to a center elastomeric block B, it being kept in mind that in the special process considered herein, such center elastomeric block B will include the coupled configuration

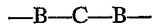

unless otherwise specified.

A number of undesirable side reactions may occur during the formation of such block copolymers, particularly if the objective is to obtain an essentially "pure" block copolymer of the structure

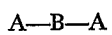

A "pure" block copolymer may be defined as one which does not contain excessive amounts of homopolymer (usually homopolystyrene) or of two-segment blocks, and is one in which the molecular weights of the respective blocks are uniform, that is, all of the polymer molecule end segments have essentially the same molecular weight and all of the mid segments have essentially the same molecular weight. The more "pure" this product is, in these respects, the more striking its properties may be. For example, one of the peculiarities of this type of composition is that it can be regarded as a "self-curing" elastomer in that, copolymers of suitable segmental molecular weights and of suitable degree of physical working (obtainable by conventional thermoplastic processing operations) have some of the properties of a vulcanized rubber and, can be utilized for elastomeric purposes without requiring any vulcanization treatment. However, the more "impurities" there are in the product of the type described above, the poorer its physical properties generally are relative to tensile strength, elongation at break, softening point, and other characteristics.

One of the greatest difficulties in the preparation of block copolymers having the A—B—A structure is to prevent or minimize the premature termination of the living polymer chains due to one of two principal influences: these are, in the first place, polymer die-out due to thermal termination and, secondly, slow propagation due to precipitation from the polymerization medium. The problem, therefore, is to maintain the polymerizing mixture in a homogeneous state and at the same time to maintain a suitable temperature and other environment which will minimize termination of the growing polymer chains. In serious cases of die-out or slow propagation, a substantial proportion of the product may be homopolymer such as polystyrene or a two-block polymer such as polystyrene-polyisoprene. While each of these particular products may of themselves be useful when in the correct molecular weight range, they do not in fact meet the desired qualities of performing like a vulcanized rubber such as is desired in the A—B—A block copolymer product. Consequently, their presence in the product is regarded as undesirable in the present invention.

Another of the difficulties encountered in the production of block copolymers with which this invention is concerned is the presence in normal commercial feeds of undesirable homologues or analogs of the desired monomer. Specifically, isoprene feeds are frequently contaminated with minor amounts of piperylene. The copolymerization of piperylene with isoprene, when initiated with lithium based catalysts, proceeds at a much lower rate and, in fact, will not readily copolymerize during the formation of the center elastomeric block of the above type of block copolymer. Hence, it does not interfere with the isoprene polymerization. However, if present when the second vinyl arene block is to be formed by introduction of vinyl arene monomer, piperylene will copolymerize with the vinyl arene. At that stage of copolymerization wherein the terminal monomer radical is piperylene, the polymerization of that particular polymer chain virtually ceases due to the low rate of addition of either styrene or piperylene. Consequently, difficulty is encountered in the formation of the third polymer block of the subject block copolymers, polymerization of the first two blocks proceeding satisfactorily but that of the third block being very slow under the desired temperature conditions unless a means is utilized for avoiding this undesirable condition.

It is an object of the present invention to provide an improved process for block copolymer formation. It is a further object of the invention to provide a block copolymerization process wherein polymer die-out and slow propagation are held at a minimum. It is a further object of the invention to provide an improved copolymerization process wherein the three segment block copolymer derived is largely uncontaminated with homopolymers or polymers comprising only two polymer blocks. It is a further object of the present invention to provide a copolymerization process combined with coupling which will result in three segment block copolymers which are symmetrical and which have segments having a uniformly narrow distribution of molecular weights. Other objects will become apparent during the following detailed description of the invention.

Now, in accordance with the present invention, a process is provided for the preparation of block copolymers having the general configuration

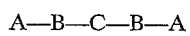

wherein each A is a polymer block of a monovinyl substituted aromatic compound, each B is a polymer block of a conjugated diene and C is a monomeric residue of a coupling agent, the basic process comprising polymerizing a monovinyl substituted aromatic compound in the presence of a lithium alkyl catalyst, adding conjugated diene and continuing polymerization to form an intermediate block copolymer

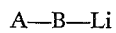

and thereafter adding a di-functional coupling agent whereby the coupled block copolymer is formed, the improvement in the basic process comprising forming the first block A under adiabatic conditions essentially free of refluxing in the presence of a polymerization solvent comprising a major proportion of a $C_{6-7}$ cyclic hydrocarbon inert solvent, said solvent during the formation of block A being essentially free of inert components having boiling points lower than that of $C_{6-7}$ hydrocarbons; thereafter adding conjugated diene and 20–80 (preferably 50–78) volume percent based on the total reaction solvent mixture of a $C_{4-5}$ open chain inert alkene and continuing polymerization under reflux condition.

The figure shows the effect of solvent composition on molecular weight distribution.

The utilization of this dual solvent system combined with the coupling reaction not only prevents inadvertent termination but also promotes uniform product quality and eliminates the disadvantages of incorporating piperylene in the second vinyl arene polymer block.

The choice of the particular class of catalysts, namely, alkyl lithium has been made in view of the finding that other potential catalysts for block copolymer preparation do not yield the same superior products. For example, the block copolymers may be made by the use of a dilithium catalyst such as dilithium naphthalene and the like, forming a di-initiated polymer block of the conjugated diene and thereafter adding the monovinyl substituted aromatic compound to form the A—B—A product. However, it has been found that the cis-trans structure of the center block formed by this latter process is undesirable and secondly, that the polymer die-out may be excessive.

The conjoint addition of both the cyclic hydrocarbon solvent, e.g., cyclohexane and an alkene solvent such as butenes, pentenes, or mixtures such as mixed butenes or mixed pentenes prior to formation of the first block A was considered but it was found that the rate of polymerization at the temperature required to effect reflux of the alkene solvent was excessive and that product and process control were therefore difficult. In other words, the presence of the lower molecular weight alkene solvents calls for a more or less uniform temperature while it is present, the temperature control being effected by refluxing of the lowest boiling solvent or mixture of solvents in the polymerization medium. This was found to be undesirable since at the temperature of reflux the rate of polymerization was so fast that molecular weight control was difficult if not impossible. Since molecular weight control for specific properties is essential, it was therefore desirable to eliminate the alkene solvents from the formation of the first block A.

On the other hand, the second block conjugated dienes were found to polymerize at a substantially lower rate than the monovinyl arenes. However, the polymerized monovinyl arenes are not reasonably soluble in open chain hydrocarbon media. It was desirable to modify the reaction medium so as to accommodate the solubility limitations of the block copolymer which would eventually have a diene polymer block and at the same time to provide for relatively elevated temperature control to accelerate the rate of polymerization.

Consequently, in accordance with the present invention, subsequent to the formation of the first polymer block A, the diene monomer was added and the reaction medium modified by the supplementary addition of a $C_{4-5}$ alkene. The formation of the diene polymer block was then effected under reflux conditions such that the $C_{4-5}$ alkene was refluxing actively with some of the previously present cyclic hydrocarbon probably refluxing together therewith. In order to provide proper solubility of the block copolymer, it is necessary to restrict the total reaction mixture to between about 20 and about 80 (preferably 50–78) volume percent of the open chain $C_{4-5}$ alkene, including butenes, pentenes, or isomeric mixtures of the same.

The vinyl aromatic compounds from which the end blocks A may be formed include particularly one or more monovinyl aromatic hydrocarbons of the benzene series, such as styrene, vinyl toluene, vinyl xylene, ethyl vinyl xylene, vinyl naphthalene, and the like. The conjugated dienes from which the center diene polymer blocks are derived are those having from 4–8 carbon atoms per molecule including especially butadiene, isoprene, methyl isoprene, and their homologues. Mixtures of the individual polymer forming monomers may be utilized in the preparation of the subject block copolymers.

The alkyl lithium compounds employed in the present process include especially those having from 1–8 carbon atoms per molecule and preferably from 4–6 carbon atoms per molecule. Branched chain and especially secondary alkyl lithium compounds are preferred since the secondary alkyl lithium has been found to form the most desirable type of polymers. This is due in part at least to the minimum "induction period" experienced with this type of catalyst which, in turn, minimizes the spread in molecular weight of the individual polymer blocks. The preferred catalyst is secondary butyl lithium although secondary amyl lithium may be employed in addition to or in place thereof.

Polymerization is normally conducted at temperatures suitable for reasonable control over molecular weight for each individual polymer block. This is not to say that polymerization cannot be conducted at higher or lower temperatures. On the contrary, it is possible to polymerize styrene rapidly with alkyl lithium catalysts over a wide range of temperatures, but the close control of molecular weight of the polymer block is essential in forming the block polymers with which the present invention is concerned having optimum physical properties.

To this end, therefore, the temperature of polymerization in the formation of the first polymer block of a monovinyl substituted arene is to be restricted to between about 20° C. and about 60° C., the preferred practice being to conduct the first block polymerization adiabatically, starting at temperatures in the order of 20–30° C. and permitting the heat of reaction to raise the temperature of the polymerization mass up to the maximum temperature in the order of 55–60° C. This will occur over the reaction time, the maximum temperature being reached quickly after which the temperature tends to decrease somewhat because of heat loss over the course of the first block polymerization which will take from about 20 minutes to about 1 hour. During this period, essentially no effective refluxing occurs due to the choice of solvent and the adiabatic reaction which is started at 20–30° C.

The solvents useful for this purpose are essentially non-polymerizable cyclic hydrocarbons which may be either saturated or unsaturated. Saturated hydrocarbons are preferred and of these cyclohexane is optimum. However, unsaturated cyclic hydrocarbons such as benzene or alkylated benzene may be employed for this purpose. Alkylated cyclopentanes may be used as well. The objective is to choose a polymerization medium containing at least a major proportion of, e.g., over 50% by weight, of at least one of the cyclic hydrocarbon solvents such that the first polymer block of the monovinyl arene is essentially soluble therein or forms no precipitate other than a very loose gel which is closely associated with the solvent and does not in effect precipitate therefrom.

The proportion of solvent employed for this purpose will vary with the specific working conditions and monomer utilized but normally will be between about 5 and 15 times the weight of the styrene initially present.

It has been found, in accordance with one aspect of the present invention, that the polymerization of styrene by means of alkyl lithium catalysts is so rapid as to prevent close control of molecular weight of the product if the polymerization is conducted at too high a temperature throughout the course of polymerization.

Consequently, recognizing this fact, the block polymerization is conducted adiabatically starting at relatively low temperatures, preferably ambient room temperature, allowing the temperature to rise without employing a refluxing solvent, e.g., a solvent of such boiling point that it would reflux under the temperature conditions existing.

The monomer for the center block of polymerized conjugated dienes is mixed with the solution of the previous polymerized block A together with an amount of open-chain alkenes sufficient to provide enough vapor pressure for reflux cooling but not so much as to cause the formation of a separate phase from the cyclohexane- polystyrene living polymer block.

The open-chain alkene utilized for this purpose must not only be a solvent for the diene monomer and (together with the cyclic hydrocarbon solvent already present) form a combined solvent for the growing polymer chains, but also must be one capable of refluxing under the controlled temperature and pressure conditions of the polymerization. Thus, the open-chain alkenes having from 4–5 carbon atoms per molecule are particularly effective for this purpose. The admixture of the polymerizing components is made under such conditions as to accelerate continued polymerization of the diene on the living end of the polymer chain (block A). Consequently, an initial temperature when polymerizing the diene block in the order of at least about 40° C. and preferably 45° C. is desirable and optimum temperatures are in the order of 50–55° C.

Shortly after introduction of the alkene and diene monomer, the temperature rises sharply and the open-chain hydrocarbon commences refluxing. Within a very short time, the cooling effect of the refluxing solvent reduces the temperature to a reasonably steady level in the order of 10–15° C. higher than the initial temperature and polymerization is continued until substantially all of the monomer has been consumed, a period of time in the order of 0.5–5 hours, preferably 1–2 hours.

The proportion of open chain $C_{4-5}$ alkene employed for the present purpose should be between about 20–80 volume percent based on the total polymerization solvent in order to provide not only the required solubility characteristics for the growing polymer chain but also sufficient temperature control by means of reflux. The reason for the restriction based on solubility is evident from an examination of the properties of polystyrene-polyisoprene 2-block copolymers made in various solvent mixtures. The ratio of the weight average molecular weight to the number average molecular weight of a linear polymer is sometimes called the heterogeneity index of the polymer. An index of unity means that all polymer chains are the same length and an index larger than unity means that the polymer is made up of chains of varying length. For practical purposes, the viscosity average molecular weight can be substituted for the weight average molecular weight. Thus, when $\overline{M}_v\overline{M}_n > 1.0$ the polymer is not of uniform chain length, and the magnitude of the index is an indication of the broadness of the molecular weight distribution. The figure shows that as poorer solvent is used in the polymerization of the polyisoprene block the molecular weight distribution of the polystyrene-polyisoprene 2-block copolymer undesirably broadens. The reason for this is that the polystyrene precipitates in the poor solvent and is slowly and unevenly solubilized as isoprene enters the polymer. The first chains to become solubilized, say those on the outside of a swollen mass of precipitate, get an extra chance to add isoprene and the result is a maldistribution of molecular weights. For the present purpose, solvent mixtures yielding a heterogeneity index of 1.0–1.05 provides products having optimum properties.

The specific coupling agent employed for coupling pairs of the intermediate block copolymer A—B—Li may be varied widely, although dihalohydrocarbon coupling agents are preferred. On the other hand, divinyl aromatic compounds such as divinyl benzene may be utilized. One class of compounds particularly suited to this process comprise dihalohydrocarbons and especially dihaloalkanes preferably having from 1 to 18 carbon atoms per molecule, still more preferably from 1 to 6 carbon atoms per molecule. These include dibromomethane, dibromoethane-1,2, dibromopropane-1,2, dibromobutane-1,2 or -2,3, dibromopentane-1,2 dibromohexane-1,2, and the corresponding dichloro or bromochloro alkanes as well. The dihaloalkanes are preferably those having the halogens on the same or adjacent carbon atoms.

Another suitable group of coupling agents which may be employed in the present process are those which contain two active halogen atoms wherein each halogen atom is attached to a carbon atom which is alpha to an activating group of the group consisting of ether linkages, carbonyl radicals and olefinic linkages.

Specific active halogen containing compounds which can be employed in carrying out the invention include the following:
bis(chloromethyl)ether
bis(1-bromoethyl)ether
1,3-dichloro-2-propanone
1,5-dichloro-2,4-pentanedione
1,4-bis(chloromethyl)benzene
1,4-dichloro-2-butene
bis(bromomethyl)ether
methyl dichloromethyl ether
bis(1-fluoropropyl)ether
bis(iodomethyl)ether
chloromethyl 1-chloropropyl ether
bis(1-iodoamyl)ether
bis(1-chlorodecyl)ether
hexyl 1,1-dichloroheptyl ether
1-chloro-n-butyl 1,1-dichloro-n-butyl ether
bis(1,1-dibromodecyl)ether 1,1-difluoroethyl 1-fluoroheptyl ether
bis[chloro(ethoxy)methyl]ether
bis[1-bromo(2-propyl)ether]ether
difluoromethyl 1-fluoro(3-ethoxy)propyl ether
bis[chloro(vinyloxy)methyl]ether
bis[1-iodo-(4-vinyloxy)n-butyl]ether
1-bromo(2-vinyloxy)ethyl 1,1-dibromopropyl ether
bis[1-chloro(5-vinyloxy)octyl]ether
bis[chloro(N,N-dimethylamino)methyl]ether
dibromomethyl1-bromo-4-(N,N-dimethylamino)n-butyl ether
bis[1-iodo-6-(N,N-diethylamino)hexyl] ether
2,2-dibromo-3-decanone
3,5,5-trichloro-4-octanone
2,4-dibromo-3-pentanone
1-chloromethyl-4-(1-chloro-n-propyl)benzene
1,3,5-tri(bromomethyl)benzene
1,4-di-chloro-2-hexane
4,4-di-chloro-2-heptene
1,1-dibromo-4-chloro-2-pentene
2,5,6,9-tetrachloro-3,7-decadiene The proportion of coupling compounds employed depends upon the character of the product desired. Nothing is to be gained by adding more than about a stoichiometric proportion for the purpose of complete reaction with the lithium radicals present to form lithium halides and couple the pairs of intermediate polymer to form the coupled product.

Maximum efficiency of coupling is obtained by incremental or continuous addition of the coupling agent, the maximum amount of coupling for a given amount of agent being experienced under these conditions. On the other hand, it may be desireable to use less than a stoichiometric amount so as to couple only a desired proportion of the intermediate polymers, leaving some of the intermediate polymer in the final product especially after neutralization and (if necessary or desired) removal of the lithium radicals. If a proportion of two block polymer is desired, less than a stoichiometric amount of the dihalogen hydrocarbon compound is utilized so as to leave in the product from 5 to 25% by weight of a 2-block copolymer as defined hereinbefore. The presence of this 2-block polymer is to improve the processability as well as the stress-strain properties of the novel compositions.

The coupling reaction is carried out by adding the dihalogen hydrocarbon compound to the intermediate block copolymer and allowing reaction to occur for 0.1–1 hours at from about 0 to about 100° C.

After the block copolymerization is complete, any uncoupled 2-block copolymer chains may be terminated by the addition of a chain terminator such as an alcohol, preferably methanol or propanol. The cement constituting the mixture of solvents and block copolymer may be treated now in any desirable manner, these stages not forming an essential part of the process of the present invention. For example, the cement may be used per se as an additive to other elastomeric materials such as polyisoprene; may be modified with pigments such as carbon black or titanium dioxide and thereafter coagulated or may be coagulated in steam and/or hot water to form a gum elastomer.

While the precise molecular weights of each of the individual blocks does not constitute an essential aspect of the present invention, it is a preferred objective of the process described and claimed to obtain a block copolymer having the characteristics of a "self-curing" elastomer or thermal plastic. The characteristics of the block copolymer will change from a true elastomer to a true thermoplastic material dependent upon the total molecular weight and especially upon the ratio of vinyl arene polymer blocks to diene elastomer polymer blocks. Preferably, the vinyl aromatic compound polymer blocks have average molecular weights between about 2,000 and 100,000 while the conjugated diene polymer blocks, prior to coupling have average molecular weights between about 5,000 and 500,000. Preferably, the terminal polymer blocks A have average molecular weights between about 5,000 and 20,000 while the average molecular weight of the diene polymer blocks prior to coupling are between about 12,500 and 250,000.

The coupling process described hereinbefore avoids the inadvertent termination of growing polymer chains when piperylene is present. Piperylene takes virtually no part in the formation of the coupled block polymers. It therefore builds up in the substantially inert components of the polymerization solvent and may be separated or utilized for purposes other than the process of this invention.

The following examples illustrate the advantages gained by the use of the present invention contrasted to block copolymerization under less desirable alternative compositions.

Example I

Styrene was polymerized adiabatically at 9% weight concentration in cyclohexane by initiation with sec-butyl lithium in an amount of yield approximately 12,000 molecular weight polymer. To this living polymer was added isoprene in a mixture of cyclohexane and mixed amylenes so that after the isoprene block was polymerized the mixture contained 14% weight polymer solids and the solvent consisted of cyclohexane and mixed amylenes. Polymerization was conducted at the reflux temperature. After the isoprene polymerization was complete the molecular weights of the SI was $\overline{M}_v=88,000$ and $\overline{M}_n=88,300$ or $\overline{M}_v/\overline{M}_n=1.00$. When this living SI was coupled by reaction with dibromoethane, the apparent increase in molecular weight, as measured by the increase in intrinsic viscosity was equivalent to a 88% coupling efficiency, i.e., the intrinsic viscosity corresponded to that of a mixture having 88% of the polymer at double the original molecular weight.

Example II

The process was repeated except for variations in the proportions of cyclohexane and mixed amylenes. The following table shows the effect of this variation on volume average molecular weight ($\overline{M}_n$), number average molecular weight ($\overline{M}_n$) and coupling efficiency.

| | | | Before coupling | | | |
|---|---|---|---|---|---|---|
| | Vol. percent cyclohexane | Vol. percent mixed amylenes | Styrene-isoprene, mol. wt. | | | Coupling efficiency |
| Sample | | | $\overline{M}_v$ | $\overline{M}_n$ | $\overline{M}_v/\overline{M}_n$ | |
| A | 19 | 81 | 82,000 | 76,700 | 1.07 | 78 |
| B | 25 | 75 | 88,000 | 87,700 | 1.00 | 82 |
| C | 35 | 65 | 77,000 | 77,500 | 1.00 | 88 |
| D | 20 | 80 | | | 1.05 | |
| E | 17 | 83 | | | 1.07 | |

These examples show that as solvent mixtures of poorer solvent power are employed the homogeneity index of the block polymer indicates a broader molecular weight distribution. As a consequence, an undesirable broadening of the three-segment block polymer takes place. This can be supported by the decrease of the "coupling efficiency" which occurs because the molecular weight distribution of a block polymer will narrow as it is coupled, giving a lower $\bar{M}_v$ for a given $\bar{M}_n$. This can be exemplified by imagining the coupling of a mixture of SI blocks of unit molecular weights 1 and 2. The result is not coupled blocks of 2 and 4, but of 2, 3, 3, and 4, a narrower weight average distribution.

Example III

Styrene was polymerized adiabatically with essentially no reflux at 10% weight concentration in cyclohexane by initiation with sec-butyl lithium in an amount to yield a polymer block having approximately 12,000 molecular weight. To this living polymer was added a mixture of an isoprene (contaminated with piperylene) and amylene blend diluted with cyclohexane, so that after the isoprene block was polymerized the mixture contained 15% polymer solids and the solvent consisted of about 60% amylenes, about 40% cyclohexane and about 0.4% piperylene (1,3-pentadiene). After the isoprene polymerization was complete, the viscosity average molecular weight of the SI was $\bar{M}_v=152,000$. To the living SI was added enough styrene monomer to make a third block having approximately 12,000 molecular weight. The latter mixture was held at 40° C. From previously observed reaction rates styrene it was estimated that the third block styrene would have reached 50% conversion in 13 minutes and each 13 minutes thereafter half of the remaining monomer would have been polymerized. Instead, it was noted that only about 30% of the styrene had reacted in 10 hours. Examination of polymer samples revealed that the first 40% of the third block contained 45% copolymerized piperylene and the entire third block contained 20–25% piperylene. It is apparent that sequential polymerization of a block copolymer containing styrene is virtually impossible if the styrene block must be added to polyisoprene where the isoprene is accompanied by piperylene.

Example IV

Styrene was polymerized adiabatically with essentially no reflux at 6% weight concentration in cyclohexane by initiation with sec-butyl lithium in an amount to yield approximately 12,000 molecular weight polymer. To this living polymer was added a mixture of the same piperyline-contaminated isoprene and amylene blend diluted with cyclohexane so that after the isoprene block was polymerized at reflux temperature, the mixture contained 12.4% polymer solids and the solvent consisted of about 65% amylenes, about 35% cyclohexane and about 0.4% piperylene. After the isoprene polymerization was complete the molecular weight of the SI was $\bar{M}_v=77,000$. When this living SI was coupled by reaction with dibromoethane, the apparent increase in molecular weight, as measured by the increase in intrinsic viscosity, was equivalent to an 88% coupling efficiency, i.e., the intrinsic viscosity corresponded to that of a mixture having 88% of the polymer at double the original molecular weight.

We claim as our invention:

1. In the process for the preparation of a coupled block copolymer having the general configuration

A—B—C—B—A wherein each A is a polymer block of a monovinyl-substituted aromatic compound, each B is polymer block of a reactive conjugated diene and C is a monomeric residue of a coupling agent joining the two blocks B, and wherein the first block A is formed in the presence of a lithium alkyl catalyst, conjugated diene is thereafter added, polymerization is continued to form the intermediate block copolymer A—B—Li and adding a difunctional coupling agent, whereby the coupled block copolymer is formed, the improvement comprising forming the first block A under adiabatic conditions at temperatures between about 20° C. and about 60° C., essentially free of refluxing in the presence of a polymerization solvent comprising a major proportion of a $C_{6-7}$ cyclic hydrocarbon inert solvent, said solvent during the formation of block A being essentially free of inert components having boiling points lower than that of said $C_{6-7}$ hydrocarbons; there after adding conjugated diene and 20–80% by volume based on the total reaction solvent of $C_{4-5}$ open chain inert alkene solvent and continuing polymerization under reflux conditions.

2. A process according to claim 1 wherein the cyclic hydrocarbon solvent is an aromatic hydrocarbon.

3. A process according to claim 1 wherein the open chain inert alkene solvent is a mixture of isomeric alkenes.

4. A process according to claim 3 wherein the alkenes are pentenes.

5. In the process for the preparation a coupled block copolymer of styrene and isoprene having the general configuration polystyrene-polyisoprene-$(CH_2)_{1-18}$ polyisoprene-polystyrene wherein the coupling unit $(CH_2)_{1-18}$ is the halogen-free residue of a dihaloalkane coupling agent, and wherein the first polystyrene block is formed in the presence of a secondary alkyl lithium catalyst, isoprene is added thereafter, polymerization is continued to form the intermediate block copolymer polystyrene-polyisoprene-Li and adding a dihaloalkane coupling agent having from 1 to 18 carbon atoms per molecule whereby the coupled block copolymer is formed, the improvement comprising forming the first polystyrene block under adiabatic conditions at temperatures between about 20° C. and about 60° C. essentially free of refluxing in the presence of cyclohexane as the polymerization solvent, said polymerization solvent being essentially free of inert solvent components having boiling points lower than that of cyclohexane; and thereafter adding isoprene and 50–78 volume percent, based on the total solvent mixture, of mixed amylenes and continuing polymerization under refluxing conditions.

6. A process according to claim 5 wherein the isoprene feed comprises a mixture of a major proportion of isoprene and a minor proportion of piperylene and wherein the wherein the latter is essentially inert under the conditions of the process.

References Cited

UNITED STATES PATENTS 3,390,207   6/1968   Moss et al.
3,231,635   1/1966   Holden et al. _____260—879

MURRAY TILLMAN, Primary Examiner

K. E. KUFFNER, Assistant Examiner

U.S. Cl. X.R.

260—880